United States Patent
Galt et al.

(10) Patent No.: US 6,491,318 B1
(45) Date of Patent: Dec. 10, 2002

(54) FOLDING CART

(76) Inventors: Tamara Lyn Galt, 1609 Benton St., Alameda, CA (US) 94501; Thomas Edward Galt, 1609 Benton St., Alameda, CA (US) 94501

( * ) Notice: Subject to any disclaimer, the term of this patent is extended or adjusted under 35 U.S.C. 154(b) by 0 days.

(21) Appl. No.: 09/753,541

(22) Filed: Jan. 2, 2001

Related U.S. Application Data
(60) Provisional application No. 60/228,856, filed on Aug. 29, 2000.

(51) Int. Cl.[7] ................................................. B62B 1/00
(52) U.S. Cl. ........................................ 280/651; 280/42
(58) Field of Search ................................ 280/638, 639, 280/651, 641, 38, 39, 42, 642, 644, 649, 659, 47.26, 47.34, 72.11, 79.2, DIG. 3, DIG. 4, 87.021; 296/26.01, 26.03, 26.06, 26.08; 297/16.2, 17, 42

(56) References Cited

U.S. PATENT DOCUMENTS

| | | | |
|---|---|---|---|
| 1,664,059 A | | 3/1928 | Cable |
| 1,942,112 A | | 1/1934 | McQuilkin |
| 2,421,751 A | * | 6/1947 | Giordano ..................... 280/41 |
| 2,649,894 A | | 8/1953 | Simmons |
| 2,691,410 A | | 10/1954 | Boucher |
| D177,208 S | | 3/1956 | Berlin |
| 3,920,259 A | * | 11/1975 | Graham ................... 280/47.34 |
| 3,945,660 A | * | 3/1976 | Zalewski ..................... 280/42 |
| 4,062,555 A | * | 12/1977 | Peng et al. ................... 280/42 |
| 4,077,641 A | * | 3/1978 | Perego ........................ 280/42 |
| 4,116,465 A | * | 9/1978 | Maclaren ................... 280/647 |
| 4,346,912 A | * | 8/1982 | Habib ........................ 280/644 |
| 4,796,909 A | * | 1/1989 | Kirkendall ................. 280/651 |
| 4,989,889 A | * | 2/1991 | Server Perez ................ 280/40 |
| 5,454,575 A | * | 10/1995 | Del Buono .................. 280/35 |
| 5,465,080 A | * | 11/1995 | Liang ....................... 190/18 A |
| 5,622,376 A | * | 4/1997 | Shamie ..................... 280/642 |
| 5,687,984 A | * | 11/1997 | Samuel ..................... 280/641 |
| 6,179,374 B1 | * | 1/2001 | Tang .......................... 297/45 |
| 6,354,619 B1 | * | 3/2002 | Kim .......................... 280/651 |

* cited by examiner

Primary Examiner—Brian L. Johnson
Assistant Examiner—G B Klebe
(74) Attorney, Agent, or Firm—Rosenberg, Klein & Lee

(57) ABSTRACT

The present folding cart is comprised of a rectangular bag and flexible support panel positioned within a rectangular frame, and wheels connected to the frame by legs. The frame is comprised of pairs of scissoring members on the ends and sides for being quickly collapsible in two dimensions. The ends of the scissoring members in each pair are offset toward each other at the corners of the frame to avoid binding during folding. An arched section is provided in each leg at one end of the frame that curve around the wheel at the other end of the frame when folded. A flexible bag is attached to the top corners of the frame, but not to the bottom corners to enable the frame to be collapsed. The flexible support panel is attached to the bottom corners of the frame to prevent the bag from sagging under a heavy load.

24 Claims, 4 Drawing Sheets

FOLDING CART

CROSS REFERENCE TO RELATED APPLICATIONS

This application claims the benefit of U.S. provisional application No. 60/228,856, filed on Aug. 29, 2000.

BACKGROUND OF THE INVENTION

1. Field of the Invention

This invention relates generally to folding carts.

2. Prior Art

Rigid carts are commonly used for transporting people, animals or objects in homes, gardens, farms, factories and stores, and between different locations. For many uses, folding carts are preferable because they can be collapsed for compact storage and transportation when not in use. Folding carts are particularly suitable for transporting children, sporting goods, gardening items, and items purchased in open air markets. Folding carts are especially advantageous for use by families when traveling, because they can be folded to fit inside automotive trunks and other compact spaces. Various prior art folding carts are known. U.S. Pat. No. 2,421,751 to Giordano discloses one with a tubular fabric bag within a frame which is collapsible in two dimensions. The upper and lower corners of the bag are secured to the frame. When the cart is collapsed, the frame is slightly lengthened in the vertical direction. This is not a problem in the Giordano cart because it is very narrow. If the cart is changed to make it much wider than it is tall, it would not be collapsible because the bag will prevent the frame from extending adequately in the vertical direction. U.S. Pat. No. 3,945,660 to Zalewski discloses another two-dimensionally collapsible cart with a fabric bag. The top corners of the bag are rigidly attached to the frame, and the lower corners are attached to the frame by elastic bands which stretch when the frame is folded. If the elastic bands are loose enough to allow the frame to be easily folded, the bag will sag under a load. If the elastic bands are tight enough to prevent the bag from sagging under a load, they will make folding difficult.

U.S. Pat. Nos. 5,622,376 to Shamie and 5,687,984 to Samuel disclose folding carts with wheels at all four corners. When folded, the front wheels are positioned on top of the rear wheels for compactness, but the collapsed size of the cart is limited by the interference between the wheels and the frame members. Other known devices include a cart with wheels folded to laterally adjacent positions that take up more room. The lower corners of the bag are not connected to the frame, so that the bag will sag under a load. The bag is limited to a square shape. Any reduction in overall height will reduce the bag height by an equal amount.

Prior art carts typically have small wheels that cannot roll very well on soft or rough surfaces, such as a lawn or soil. Prior art carts also typically have frame members on each side of the cart that are completely parallel to each other when seen from the top. The top and bottom pivots between the sides are thus not vertically aligned with each other, so that the frame will bind during folding.

OBJECTIVES OF THE INVENTION

Accordingly, the objectives of the present folding cart are:

to be collapsible into a very compact shape to allow placement in compact spaces, such as an automotive trunk;

to have larger wheels for better rolling;

to be foldable into a very compact shape despite the large wheels;

to have a bag which does not sag under a heavy load;

to fold easily and smoothly;

to be strong and rigid enough when expanded;

to be lightweight;

to be producible in any height, length, and width; and to be sufficiently rigid in the vertical and horizontal directions when expanded.

Further objectives of the present invention will become apparent from a consideration of the drawings and ensuing description.

BRIEF SUMMARY OF THE INVENTION

The present folding cart is comprised of a rectangular bag and a flexible support panel positioned within a rectangular frame, and wheels connected to the frame by legs. The frame is comprised of pairs of scissoring members on the ends and sides for being quickly collapsible in two dimensions to a very compact shape. The ends of the scissoring members in each pair are offset toward each other to align the upper and lower corners of the frame so as to avoid binding during folding. An arched section is provided in each leg at one end of the frame that curve around the wheel at the other end of the frame when folded. Each arched section is engaged against an adjacent scissoring member for rigidity when the frame is expanded. A flexible bag is attached to the top corners of the frame, but not to the bottom corners to enable the frame to be collapsed. The flexible support panel is attached to the bottom corners of the frame to prevent the bag from sagging under a heavy load, and to improve rigidity in the horizontal directions.

DRAWING REFERENCE NUMERALS

| | |
|---|---|
| 10. | Bag |
| 11. | Frame |
| 12. | Outer Covering |
| 13. | Front Wheels |
| 14. | Front Legs |
| 15. | Rear Wheels |
| 16. | Rear Legs |
| 17. | Handle |
| 18. | Scissoring Member |
| 19. | Scissoring Member |
| 20. | Scissoring Member |
| 21. | Scissoring Member |
| 22. | Scissoring Member |
| 23. | Scissoring Member |
| 24. | Pivot |
| 25. | Joint |

-continued

| | |
|---|---|
| 26. | Arched Section |
| 27. | Downwardly Projecting Section |
| 28. | Latch |
| 29. | Support Panel |
| 30. | Straps |
| 31. | LatchPin |
| 32. | Webbing |
| 33. | Joint |
| 34. | Hooked End |

DETAILED DESCRIPTION OF THE INVENTION

Figure 1:
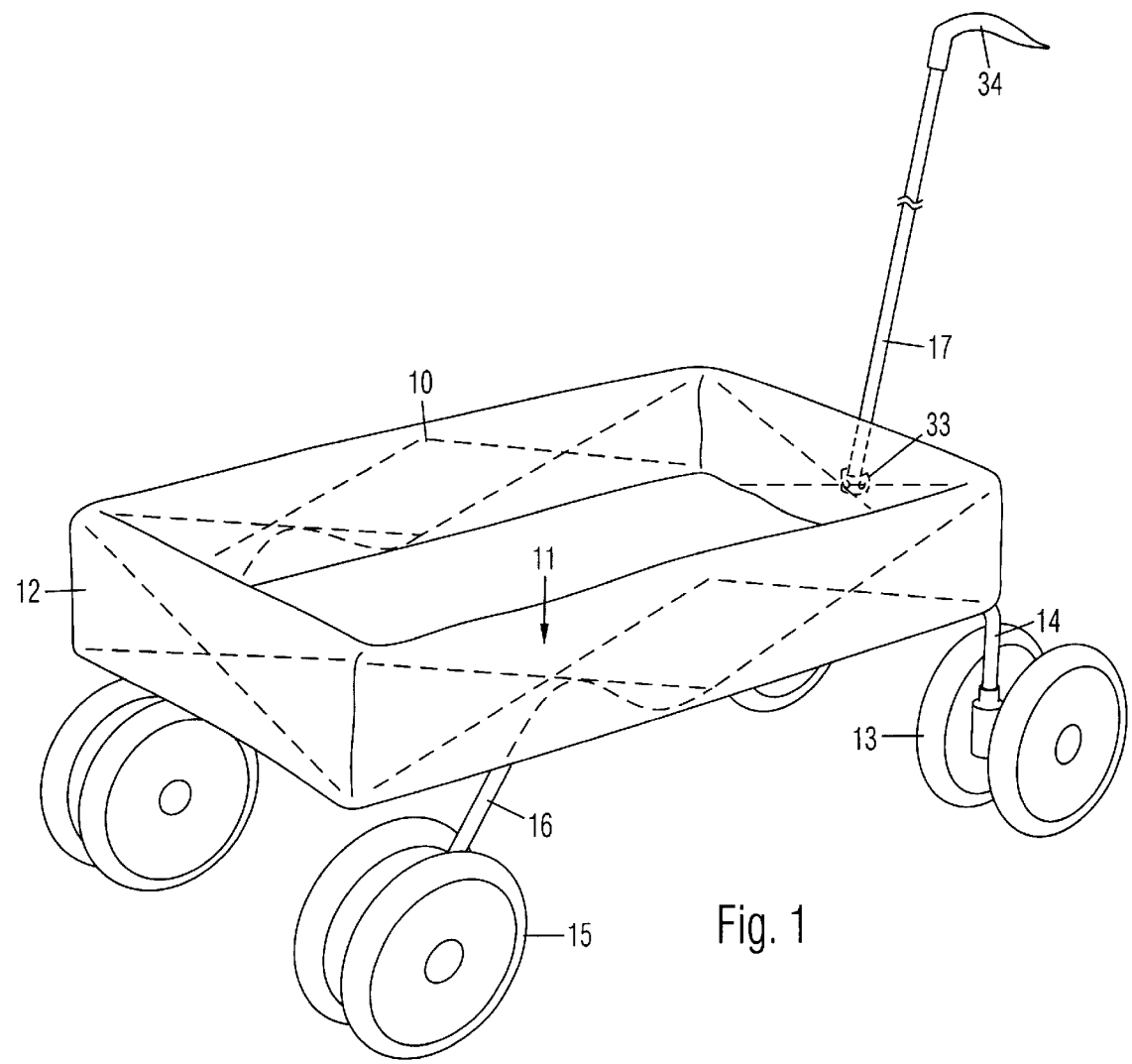
FIG. 1 is a perspective view of the present folding cart.

A preferred embodiment of the present folding cart is shown in a perspective view in FIG. 1. It comprises a rectangular bag 10 positioned within a rectangular frame 11, and an outer covering 12 wrapped around frame 11, which is thus padded on the inside and the outside. Front wheels 13 are attached to front legs 14 projecting down adjacent the front of the frame 11, and rear wheels 15 are attached to rear legs 16 projecting down adjacent the rear of frame 11. Front wheels 13 are preferably pivoting for steering, and rear wheels are preferably non-pivoting. All the wheels are preferably large for better rolling on soft or rough surfaces. Although double wheels are shown at each corner, single wheels may be provided instead. Also, the wheels can be replaced with skis for use on snow. A rigid pull handle 17 is pivotally attached to the front of frame 11 by a joint 33 that permits pivotal displacement about a pair of axes, although it can be attached to the rear instead. Handle 17 is preferably provided with a hooked end 34, but any other type of end may be provided. Also, the handle may be a cord instead of a rigid bar. Also, the sides of bag 10 may extend above frame 11 to increase cargo capacity without increasing frame size.

Figure 2:
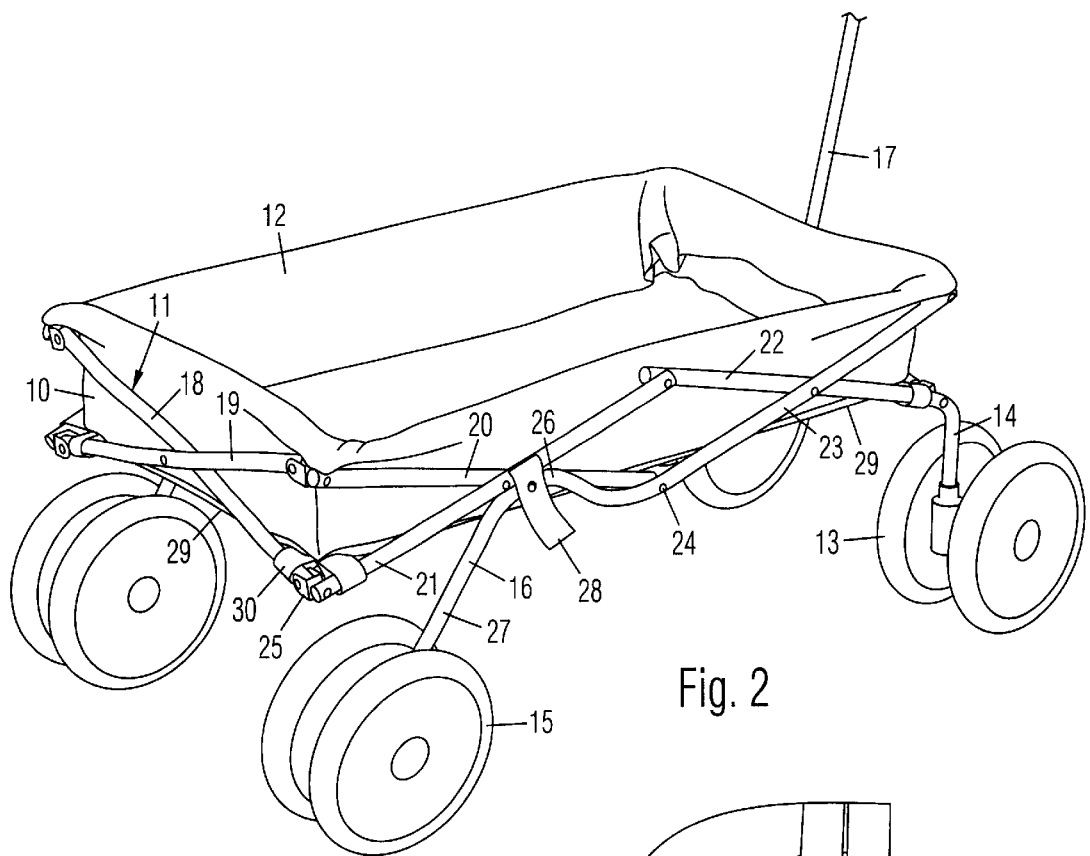
FIG. 2 is a perspective view of the cart with an outer covering folded inward to expose a collapsible frame.

In FIG. 2, the cart is shown with outer covering 12 folded inside bag 10 to reveal frame 11. Frame 11 comprises at least one pair of front end scissoring members 18, 19 at the front, and at least one pair of rear end scissoring members (not shown) at the rear. Each longitudinal side of frame 11 includes a first pair of side scissoring members 20, 21 connected to a second pair of side scissoring members 22, 23. The pairs of side scissoring members are hinged together end-to-end by pivots 24. The end scissoring members are connected to the side scissoring members by joints 25 that permit pivotal displacement about a pair of axes at the corners of frame 11. The scissoring members are preferably hollow tubes for lightweight and high strength. Frame 11 can be collapsed by extending it in the vertical direction and compacting it in two horizontal directions.

Each front leg 14 is connected to the outer end of a corresponding side scissoring member 23 adjacent a lower front corner of frame 11. Each rear leg 16 is connected to a corresponding inner end of side scissoring member 23, and is comprised of an upwardly arched inner section 26 and a downwardly projecting outer section 27. Arched inner section 26 is abutted against side scissoring member 21 for rigidity when frame 11 is expanded, and they are locked together by a latch 28 to prevent frame 11 from inadvertently collapsing during use. Latch 28 may be provided on one or both sides of frame 11, or located elsewhere. Also, another type of latch may be provided.

Alternatively, frame 11 may be provided with additional pairs of scissoring members at the ends and sides for providing a cart of a different size and proportion. The ratio between the width and length can be varied as long as it is comprised of whole numbers, such as 1:2, 1:3, 1:4, 2:3, 2:5, etc. Also, the distance between pivots 24 on each scissoring member, and between joint 25 and an adjacent pivot 24 on each scissoring member should be substantially the same.

The top corners of bag 10 are attached to the top corners of frame 11, but only at the corners to avoid impeding the collapse of frame 11. The bottom corners of bag 10 are free from frame 11 to facilitate folding. Since the top and bottom corners of frame 11 increase in distance during collapse, the bottom corners of bag 10 should not be attached to frame 11. Rectangular flexible support panel 29 is attached to the bottom corners of frame 11, preferably by straps 30. Bag 10 is prevented from sagging under a heavy load by support panel 29. Frame 11 is also given improved lateral rigidity by support panel 29, as validated by testing.

Figure 3:
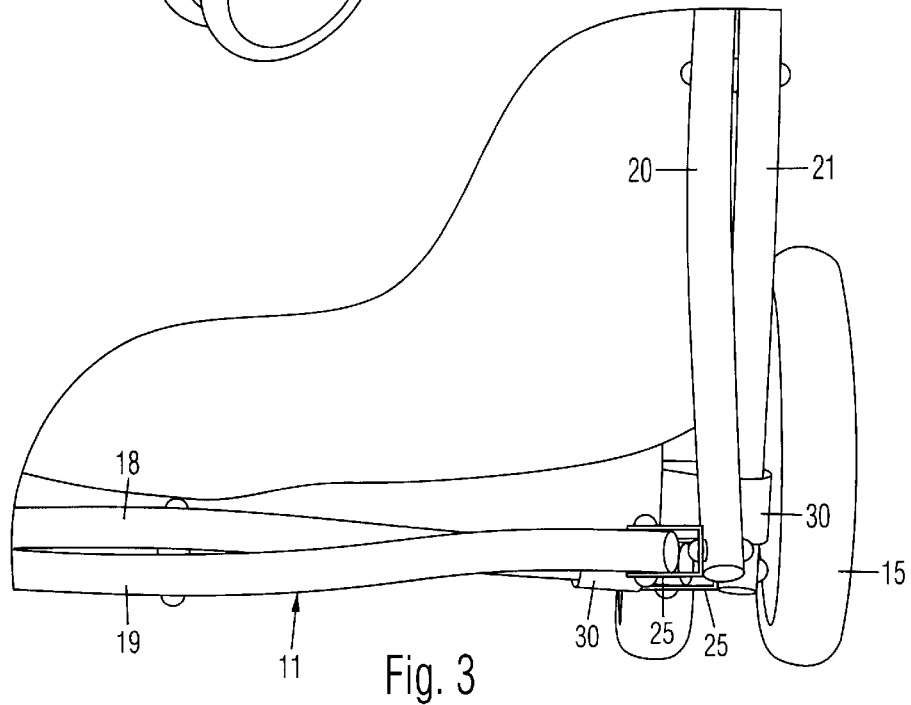
FIG. 3 is a top view of a corner of the frame.

When seen in a top view in FIG. 3, the intermediate portions of end scissoring members 18, 19 are positioned side-by-side to each other, whereas the ends are offset toward each other at the corners of frame 11 to precisely align joints 25 vertically to ensure smoother folding. The outer ends of side scissoring members 20, 21 are offset toward each other in the same manner. The other scissoring members are also offset in the same manner at the other corners of frame 11.

Figure 4:
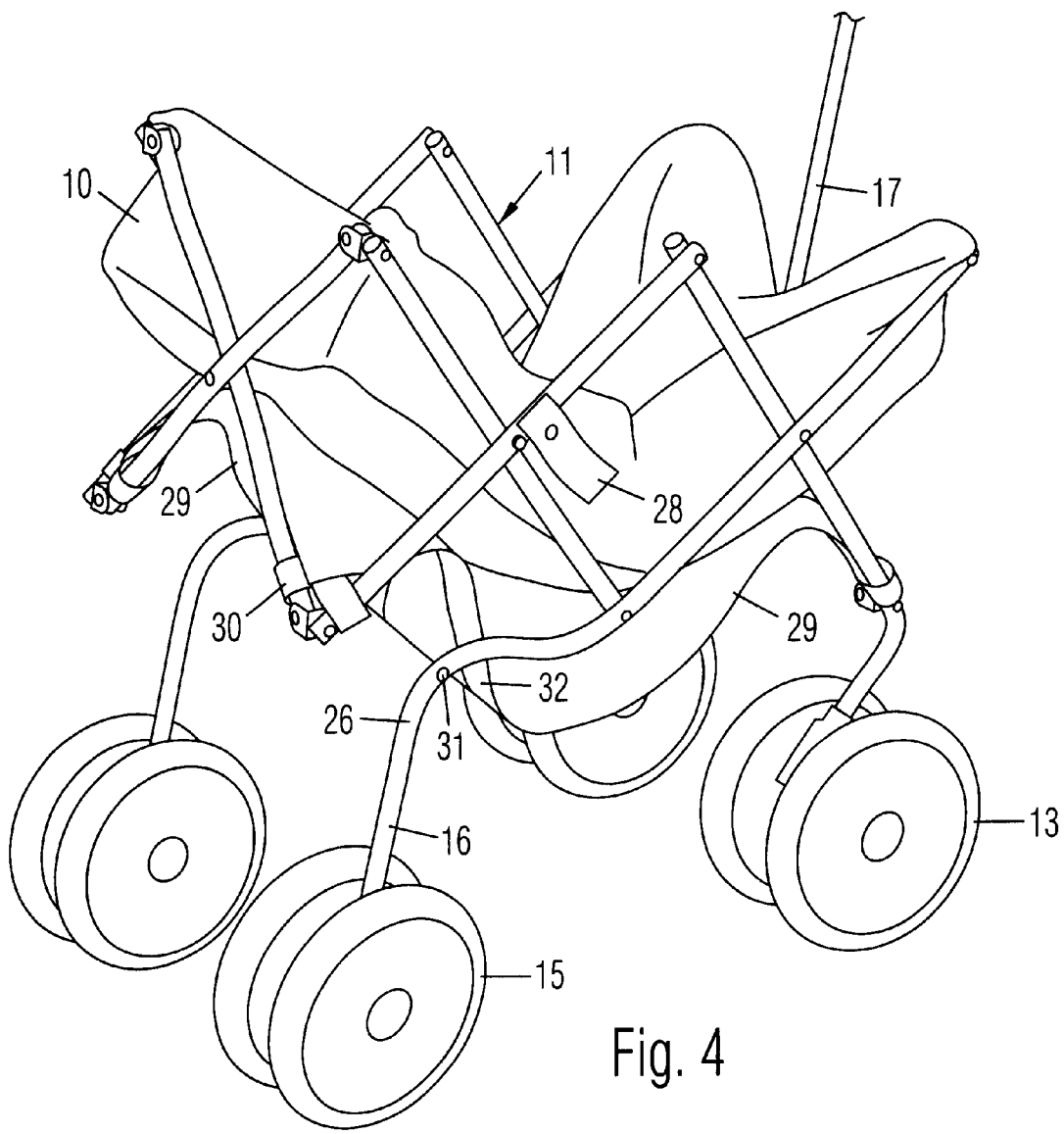
FIG. 4 is a perspective view of the cart partially folded, and with an outer covering folded inward to allow the details of the frame to be clearly seen.

The cart is shown partially folded in FIG. 4. Latch 28 has been released from a pin 31 on arched section 26 of leg 16 to enable collapse. The corners of support panel 29 are separated from the bottom corners of bag 10 as frame 11 is extended vertically and compacted in the horizontal directions. Support panel 29 is preferably reinforced with webbing 32. Alternatively, webbing 32 may be eliminated if support panel 29 is substantially non-stretchable.

Figure 5:
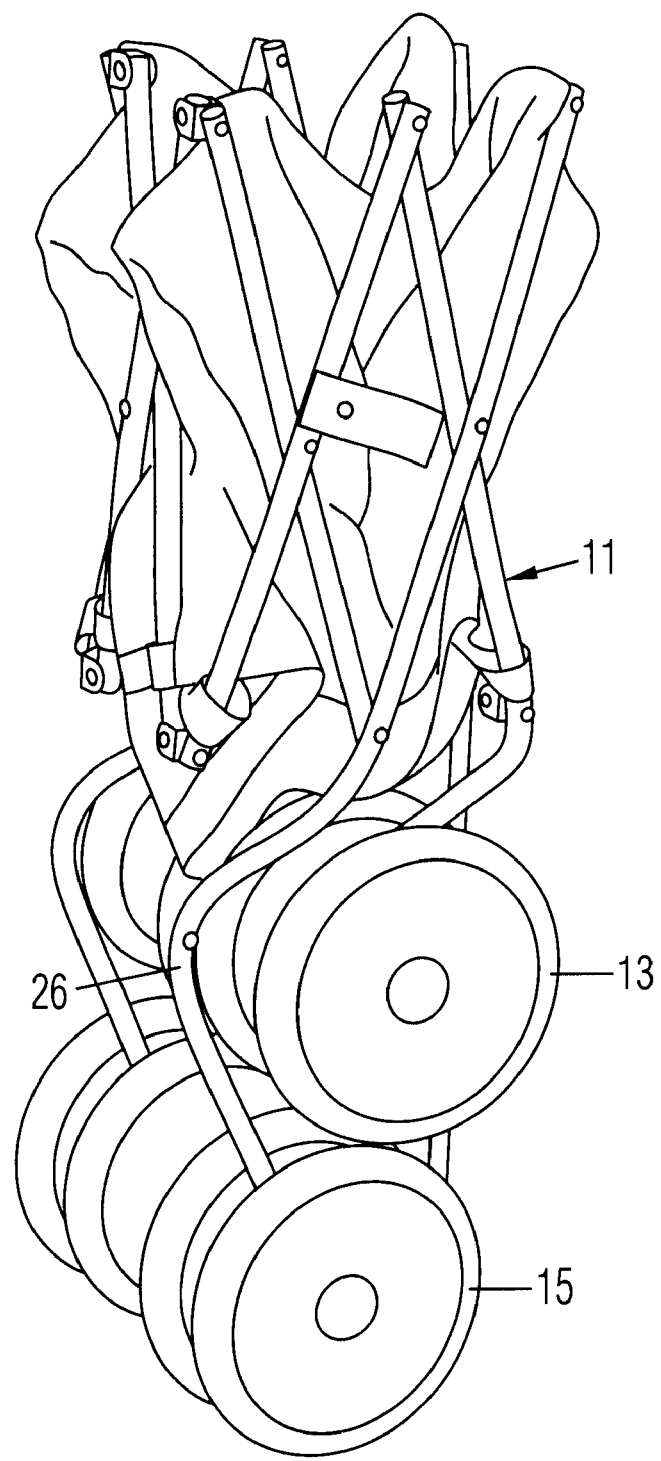
FIG. 5 is a perspective view of the cart fully folded, and with the outer covering folded inward to allow the details of the frame to be clearly seen.

The cart is shown nearly fully collapsed in FIG. 5. Front wheels 13 are positioned substantially directly on top of rear wheels 15 along a vertical axis of collapsed frame 11 to enable the cart to be more compactly folded. This is possible because arched sections 26 are curved around front wheels 13.

SUMMARY AND SCOPE

Accordingly, the present cart is collapsible into a very compact shape. It has larger wheels for better rolling. It is foldable into a very compact shape despite the large wheels. It has a bag which does not sag with a load. It folds easily and smoothly. It is strong and rigid enough when expanded. It is also lightweight.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

We claim:

1. A folding cart, comprising:
a collapsible frame which is extended in a vertical direction and compacted in two horizontal directions when collapsed, said frame being defined by front and rear scissoring assemblies, and at least a pair of side scissoring assemblies extending transversely between said front and rear scissoring assemblies, each said front, rear, and side scissoring assembly including at least one pair of crossed scissoring members pivotally joined at an intermediate point, at least one scissoring member of each said front and rear scissoring assembly being joined to each of said side scissoring assemblies in pivotally displaceable manner about a pair of axes, said front, rear, and side scissoring assemblies being collapsible respectively about said intermediate points thereof;

at least a first of said scissoring members of each said side scissoring assembly terminating at a first leg portion having a front wheel rotatably coupled thereto, and at least a second of said side scissoring members of each said side scissoring assembly terminating at a second leg portion having a rear wheel rotatably coupled thereto, at least one of said first and second leg portions including an arched section for receiving in nested manner said wheel coupled to the other of said first and second leg portions when said frame is collapsed;

a bag positioned within said frame and attached to said front, rear, and side scissoring assemblies of said frame to avoid impeding collapse of said frame, a bottom of said bag remaining detached from said frame to facilitate folding; and a flexible horizontal support panel secured across a lower end of said frame for supporting said bag when subjected to a load, and for providing lateral rigidity to said frame.

2. The folding cart of claim 1, further including webbing attached across said support panel for reinforcement.

3. The folding cart of claim 1, further including a handle connected to said frame.

4. The folding cart of claim 1, further including a handle with a hooked outer end, and an inner end connected to said frame.

5. The folding cart of claim 1, wherein a ratio between a width and a length of said frame is comprised only of whole numbers for facilitating folding.

6. The folding cart of claim 1, further including an outer covering wrapped around said frame.

7. A folding cart, comprising:

a collapsible frame with a first end, a second end, and opposite sides, wherein said frame is extended in a vertical direction and compacted in two horizontal directions when collapsed, said frame being defined by front and rear scissoring assemblies, and at least a pair of side scissoring assemblies extending transversely between said front and rear scissoring assemblies for supporting a flexible bag member, each said side scissoring assembly including a plurality of crossed scissoring members pivotally joined at an intermediate point, each said scissoring member of said side scissoring assemblies being joined to one of said front and rear scissoring assemblies in pivotally displaceable manner about a pair of axes, said front, rear, and side scissoring assemblies being collapsible respectively about said intermediate points thereof, at least a first of said scissoring members of each said side scissoring assembly terminating at a first leg portion having a first wheel rotatably coupled thereto, and at least a second of said scissoring members of each said side scissoring assembly terminating at a second leg portion having a second wheel rotatably coupled thereto, at least said first leg portion including an arched section for receiving in nested manner said second wheel coupled to said second leg portion when said frame is collapsed;

wherein when said frame is collapsed into a vertically elongated shape, each said second wheel is positioned substantially directly on top of one said first wheel to enable said cart to be more compactly collapsed, said arched section in each said first leg portion is curved around one said second wheel to enable said second wheel to be positioned substantially directly on top of one said first wheel.

8. The folding cart of claim 7, further including a handle connected to said frame.

9. The folding cart of claim 7, further including a handle with a hooked outer end, and an inner end connected to said frame.

10. The folding cart of claim 7, wherein at least one pair of said wheels are pivoted about a generally vertical axis for steering.

11. A folding cart, comprising:

a collapsible rectangular frame with a first end, a second end, opposite sides, and four corners;

wherein said first end, said second end, and said opposite sides each include at least one pair of crossed scissoring members for supporting a flexible bag;

wherein outer ends of said pair of scissoring members at each of said corners of said frame are connected orthogonally to an adjacent pair of scissoring members by joints for pivotal displacement about a pair of axes;

wherein intermediate portions of each said pair of crossed scissoring members are positioned side-by-side to each other and connected together by an intermediate pivot, said frame being collapsible about said intermediate pivots;

wherein outer ends of each said pair of scissoring members are offset toward each other at each of said corners of said frame to align said joints vertically to avoid binding when said frame is collapsed.

12. The folding cart of claim 11, further including a handle connected to said frame.

13. The folding cart of claim 11, further including a handle with a hooked outer end, and an inner end connected to said frame.

14. The folding cart of claim 11, further including additional pairs of scissoring members on said sides of said frame.

15. The folding cart of claim 11, wherein each of said joints is disposed in substantially equidistant manner relative to a scissoring member intermediate pivot adjacent thereto for facilitating folding.

16. A folding cart, comprising:

a rectangular frame with a first end, a second end, opposite sides, four upper corners, and four lower corners, wherein said frame includes:

a first pair of crossed end scissoring members at said first end of said frame pivotally joined one to the other about a first intermediate point;

a second pair of crossed end scissoring members at said second end of said frame pivotally joined one to the other about a second intermediate point; and, at each side of said frame a first pair of crossed side scissoring members pivotally joined one to the other about a third intermediate point and hinged end-to-end by pivots to a second pair of crossed side scissoring members pivotally joined one to the other about a fourth intermediate point, wherein said first pair of side scissoring members is adjacent said first end of said frame, and said second pair of side scissoring members is adjacent said second end of said frame;

wherein said first pair and said second pair of end scissoring members are respectively connected to adjacent pairs of said side scissoring members by joints at said upper corners and lower corners of said frame for pivotally displacement about a pair of axes;

wherein said first pair and said second pair of end scissoring members are positioned side-by-side, and outer ends of each pair of said scissoring members are offset toward each other at said upper corners and said lower corners of said frame to vertically align said joints to ensure smoother folding;

wherein said cart is collapsible by extending said frame in a vertical direction for collapse about said first, second, third, and fourth intermediate points and thereby compacting said frame in two horizontal directions into a vertically elongated shape;

a first pair of legs each connected to an outer end of a corresponding side scissoring member at said first end of said frame at a corresponding lower corner;

a first pair of wheels attached to said first pair of legs;

a second pair of legs each connected to an inner end of one of said side scissoring members in said first pair, each of said second pair of legs including an upwardly arched inner section and a downwardly projecting outer section, wherein said arched inner section is abutted against one of said side scissoring members in said second pair for rigidity when said frame is expanded;

a second pair of wheels attached to said second pair of legs;

wherein when said frame is collapsed into said elongated shape, said first pair of wheels are positioned substantially directly on top of said second pair of wheels along a longitudinal axis of said elongated shape to enable said cart to be more compactly folded, said arched sections of said second pair of legs are respectively curved around said first pair of wheels to enable said first pair of wheels to be positioned substantially directly on top of said second pair of wheels;

a latch detachably connecting said arched inner section of each of said second pair of legs and one of said second pair of side scissoring members to temporarily lock said frame in an expanded position;

a bag positioned within said frame and attached to said scissoring members at said upper corners of said frame to avoid impeding collapse of said frame, wherein bottom corners of said bag are detached from said frame to facilitate folding; and a rectangular flexible support panel secured to said lower corners of said frame to prevent said bag from sagging under load, and to provide lateral rigidity to said frame, wherein said support panel is reinforced with webbing.

17. The folding cart of claim 16, further including a handle connected to said frame.

18. The folding cart of claim 16, further including a handle with a hooked outer end, and an inner end connected to said frame.

19. The folding cart of claim 16, further including additional pairs of scissoring members on said sides of said frame.

20. The folding cart of claim 16, wherein each of said joints is disposed in substantially equidistant manner relative to an intermediate point adjacent thereto for facilitating folding.

21. The folding cart of claim 16, further including an outer covering wrapped around said frame.

22. A folding cart comprising:

(a) a frame reconfigurable between open and collapsed configurations, said frame being defined by a pair of first scissoring assemblies, and at least a pair of second scissoring assemblies extending transversely between said first scissoring assemblies, each of said first and second scissoring assemblies including at least a pair of crossed scissoring members pivotally joined at an intermediate point, at least one scissoring member of each said first scissoring assembly being joined to each of said second scissoring assemblies in pivotally displaceable manner about a pair of axes, said first and second scissoring assemblies being collapsible respectively about said intermediate points thereof;

at least one said scissoring member of each said second scissoring assembly terminating at a first leg portion having a wheel rotatably coupled thereto, at least one said scissoring member of each said second scissoring assembly terminating at a second leg portion having a wheel rotatably coupled thereto, said first leg portion including an arched section for receiving one said second leg portion wheel in nested manner when said frame is disposed in said collapsed configuration; and, (b) a flexible bag member coupled to said frame for collapsible suspension from said first and second scissoring assemblies.

23. The folding cart as recited in claim 22 wherein each said side scissoring assembly includes a plurality of said scissoring member pairs, said scissoring member pairs being pivotally joined one to the other.

24. The folding cart as recited in claim 22 further comprising a flexible support panel coupled to extend between said scissoring assemblies, said support panel extending beneath said bag member.

* * * * *